Oct. 24, 1939.  L. G. HOWLETT  2,177,487
COOKING UTENSIL ASSEMBLY
Filed Dec. 12, 1938  2 Sheets-Sheet 2
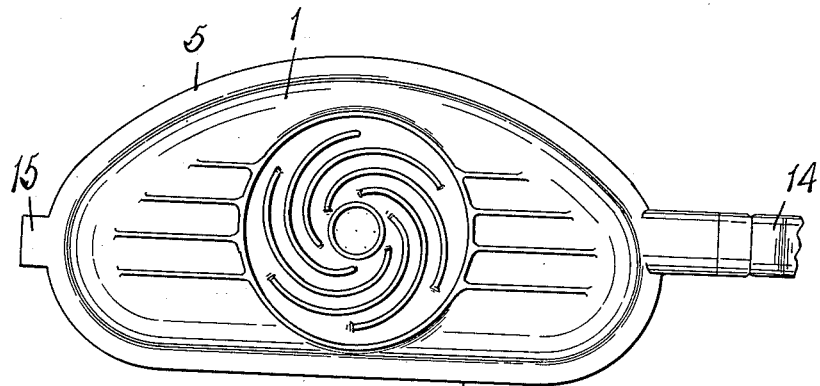
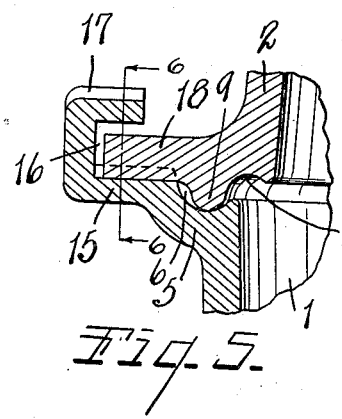
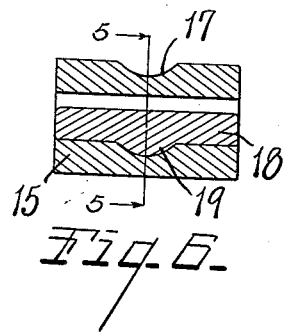
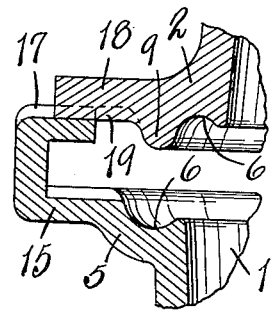
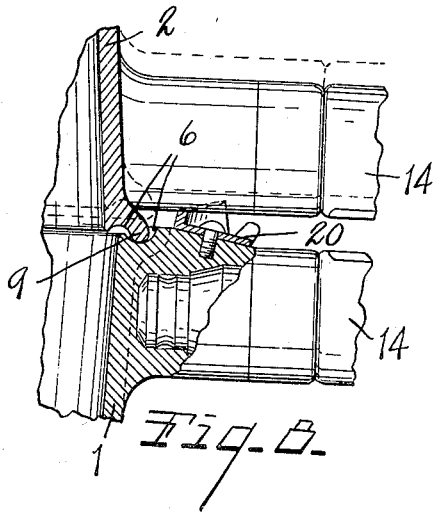
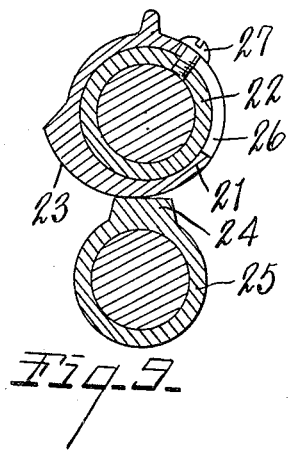
INVENTOR.
Lewis G. Howlett
BY Earl & Chappell
ATTORNEYS Patented Oct. 24, 1939

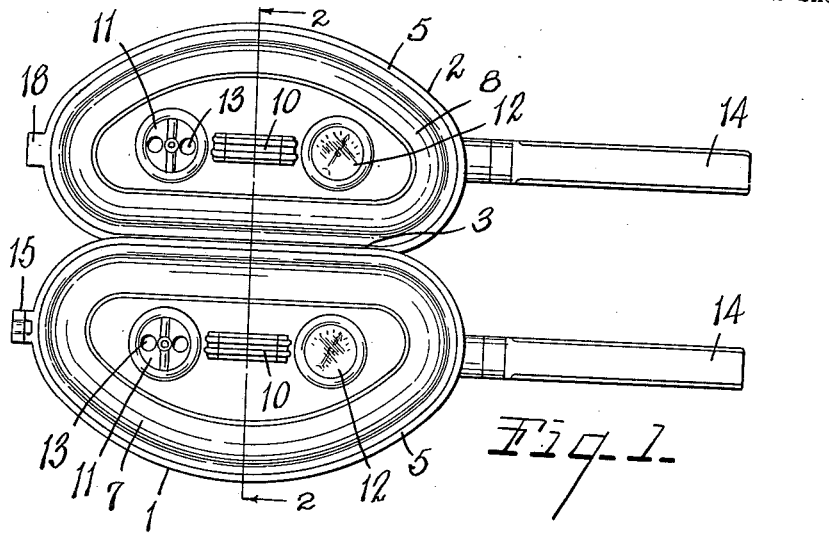

2,177,487

UNITED STATES PATENT OFFICE 2,177,487

COOKING UTENSIL ASSEMBLY

Lewis G. Howlett, Hartford, Mich., assignor to Cookware Company of America, Hartford, Mich., a corporation of Michigan Application December 12, 1938, Serial No. 245,163

6 Claims. (Cl. 53—8)

This invention relates to improvements in cooking utensil assemblies.

The main objects of this invention are:

First, to provide a cooking utensil assembly of the multiple receptacle type which may be compactly arranged upon a single burner and utilize a relatively large portion of the heating surface or heating units thereof, at the same time one which is attractive in appearance and easily manipulated.

Second, to provide a multiple unit cooking utensil assembly which is capable of a very considerable manipulation for different purposes or uses in the cooking art.

Objects relating to details and economies of the invention will appear from the description to follow. The invention is defined and pointed out in the claims.

A preferred embodiment of the invention is illustrated in the accompanying drawings, in which:

Fig. 1 is a plan view of my cooking utensil assembly with the units in assembled relation as occupied when on a burner.

Fig. 2 is a vertical section on line 2—2 of Fig. 1, a burner being indicated conventionally by dotted lines.

Fig. 3 is a side elevation of one adaptation or adjustment of my cooking utensil assembly in which one of the receptacles or pans is inverted upon the other to form a double omelet pan, a frying pan, or a covered saucepan or the like.

Fig. 4 is an inverted view of one of the receptacles, the handle being partially broken away.

Fig. 5 is an enlarged fragmentary section on line 5—5 of Fig. 6, showing the relation of the assembled receptacles when adjusted to provide a vapor seal between them.

Fig. 6 is a fragmentary section on line 6—6 of Fig. 5.

Fig. 7 is a fragmentary section corresponding to that of Fig. 5 with the receptacles adjusted for venting.

Fig. 8 is an enlarged fragmentary view partially in section of the receptacles in superimposed relation adjusted in vapor seal relation.

Fig. 9 is a fragmentary section of a modified form of the adjustable venting support.

In the embodiment of my invention illustrated, my improved cooking utensil assembly comprises a pair of pans or receptacles 1 and 2 of generally oval horizontal section and having flattened sides 3 and 4 respectively. Both receptacles are provided with outwardly offset rims 5 having upwardly facing continuous grooves 6 therein. It will be noted that the receptacle 1 is substantially deeper than the receptacle 2 so that when they are positioned with their flattened sides together, the rim of the shallower receptacle is below the rim of the deeper receptacle.

The receptacles 1 and 2 are provided with domed covers 7 and 8 respectively, the cover 8 being higher than the cover 7 so that it compensates for the difference in depth of the receptacles, see Fig. 2. This results in a uniform attractive appearance when the receptacles are placed side by side. It will be noted that the cover 8 is so shaped that it does not interfere with the rim on the flattened side of the receptacles.

The covers are provided with outwardly offset edges 9 which rest in the grooves 6 and provide what I designate as a vapor seal.

Each cover is provided with a handle 10 with a venting valve 11 and with a thermostat 12. The thermostat is shown conventionally while the valves are provided with suitable holes 13 adapted to be brought into register with corresponding holes in the cover.

The receptacles are provided with handles 14 at one end and the deeper receptacle is provided with a projecting ear 15 at its opposite end provided with an inwardly facing recess 16 and with an upwardly facing groove 17 in its top.

The shallower receptacle 2 is provided with a lug 18 opposite its handle adapted to be engaged in the recess 16 as shown in Fig. 5 or in the groove 17, the lug 18 being provided with a rib 19 on its underside adapted to engage within the groove 17 for supporting the receptacles laterally.

The receptacle 2 may be inverted upon the receptacle 1 as shown in Figs. 3 and 8 with the rim 9 of the receptacles engaged within the groove 6 of the receptacle 1. Of course, the parts may be arranged with either receptacle at the top but normally the deeper receptacle would be positioned at the bottom.

With this arrangement, a sealed cooking utensil assembly is provided such as an omelet pan or a double frying pan or a covered cooking utensil generally. If it is desired to vent the utensil of this combination, the receptacle 2 may be adjusted so that the lug 18 thereof rest upon the top of the ear 15 thus supporting the upper utensil in a tilted position with a ventilating space around a substantial portion of the rims. As an alternative in venting means, the receptacles may be held in spaced relation by means of the support 20 which is rotatably mounted on the one handle and provided with a cammed surface so that when in one position it supports the upper receptacle in a tilted partially elevated position. The support 20 is shown in non-venting position in Fig. 8.

In the embodiment shown in Fig. 9, the venting support 21 is rotatably mounted on the receptacle handle 22 and is provided with a cammed surface 23 which coacts with a lug 24 on the opposed handle 25. In the embodiment of Fig. 9, the adjustable member embraces the handle whereas in that of Fig. 8 it is arranged on the top thereof. To determine the position of the support 21, it is slotted at 26 to coact with the stop pin 27 arranged through the slot.

For storage or shipment, the shallower receptacle may be nested within the deeper receptacle and the shallower cover within the deeper cover. While of course the handles on the cover prevent very campact nesting, the parts may be thus arranged to save considerable space.

My improved cooking utensil assembly is highly efficient, that is, the two units may be used on the same burner, the assembly presents an attractive appearance and it is capable of a very considerable manipulation of adjustment for different purposes.

I have illustrated and described my improvements in what I consider very practical embodiments thereof. I have not attempted to illustrate or describe certain other embodiments or adaptations as it is believed that this disclosure will enable those skilled in the art to embody or adapt my improvements as may be desired.

Having thus described my invention, what I claim as new and desire to secure by Letters Patent, is:

1. A cooking utensil assembly comprising a pair of covered cooking utensils of generally oval form and flattened on one side to permit their being compactly arranged side by side on the same burner, said utensils comprising receptacles having outwardly offset rim portions provided with upwardly facing grooves, the receptacles varying in height to permit the rim of one on its flattened side to lie below the rim of the other on its flattened side when the receptacles are positioned side by side as upon a burner, a rim of the shorter receptacle engaging the body of the taller receptacle in said position thereof whereby the spacing of the receptacles equals the thickness of the last named rim, the covers of said receptacles having their lower edges conformed to rest in said upwardly facing rim grooves, the receptacles being proportioned to be superimposed one upon the other with one receptacle in inverted position and with the edge of the rim of one receptacle engaged within the groove of the other receptacle, each of said receptacles being provided with a handle projecting from one end thereof, the handles being in overlying relation for simultaneous grasping when one receptacle is inverted upon the other, one of said receptacles being provided with an ear having an inwardly facing recess and a groove in the top thereof opposite its handle and the other receptacle having a lug engageable within said recess of said ear or with said groove in the top of said ear, and one of said handles having an adjustable element engaging the other to vertically space the receptacles.

2. A cooking utensil assembly comprising a pair of covered cooking utensils of generally oval form and flattened on one side to permit their being compactly arranged side by side on the same burner, said utensils comprising receptacles having outwardly offset rim portions provided with upwardly facing grooves, the receptacles varying in height to permit the rim of one on its flattened side to lie below the rim of the other on its flattened side when the receptacles are positioned side by side as upon a burner, the covers of said receptacles having their lower edges conformed to rest in said upwardly facing rim grooves, the receptacles being proportioned to be superimposed one upon the other with one receptacle in inverted position and with the edge of the rim of one receptacle engaged within the groove of the other receptacle, each of said receptacles being provided with a handle projecting from one end thereof, the handles being in overlying relation for simultaneous grasping when one receptacle is inverted upon the other, one of the receptacle handles being provided with an adjustable support adapted when in one position to constitute a spacing member for the receptacles.

3. A cooking utensil assembly comprising a pair of covered cooking utensils shaped to permit their being compactly nested side by side, said utensils comprising receptacles having outwardly offset rim portions and varying in height to permit the rim of one to lie below the rim of the other when the receptacles are nested side by side, the receptacles being adapted to be disposed one upon the other in inverted position and with their rims in coengaging relation, each of said receptacles being provided with correspondingly positioned handles, the handles being in overlying relation for simultaneous grasping when one receptacle is inverted upon the other, one of the receptacle handles being provided with an adjustable support adapted when in one position to constitute a spacing member for the receptacles.

4. A cooking utensil assembly comprising a pair of covered cooking utensils shaped to permit their being compactly nested side by side, said utensils comprising receptacles having outwardly offset rim portions and varying in height to permit the rim of one to lie below the rim of the other when the receptacles are nested side by side, the covers of said receptacles having their lower edges conformed to engage the rims of the receptacles, the receptacles being adapted to be disposed one upon the other in inverted position and with their rims in coengaging relation, each of said receptacles being provided with a correspondingly positioned handle, the handles being in overlying relation for simultaneous grasping when one receptacle is inverted upon the other, and an element on one of said handles engageable with the other thereof to vertically space the receptacles.

5. A cooking utensil assembly comprising a pair of covered cooking receptacles shaped to permit their being compactly nested side by side with their respective covers in position or to permit the receptacles being disposed one upon the other in inverted position, each of said receptacles being provided with a correspondingly positioned handle, the handles being in overlying relation for simultaneous grasping when one receptacle is inverted upon the other, one of the receptacle handles being provided with an adjustable support adapted when in one position to constitute a spacing member for the receptacles.

6. A cooking utensil assembly comprising a pair of covered cooking utensils shaped to permit their being compactly nested side by side with their respective covers in position or to permit the utensils being disposed one upon the other in inverted position, each of said utensils being provided with a correspondingly positioned handle, the handles being in overlying relation for simultaneous grasping when one utensil is inverted upon the other, one of said utensils being provided with an ear having an inwardly facing recess and the other with a lug engageable therewith, and means on one of said utensils engageable with the other to permit vertical spacing thereof when desired.

LEWIS G. HOWLETT.